J. A. COOK.
APPARATUS FOR CUTTING AND BEVELING STRIPS.
APPLICATION FILED APR. 1, 1918.
1,290,097.
Patented Jan. 7, 1919.
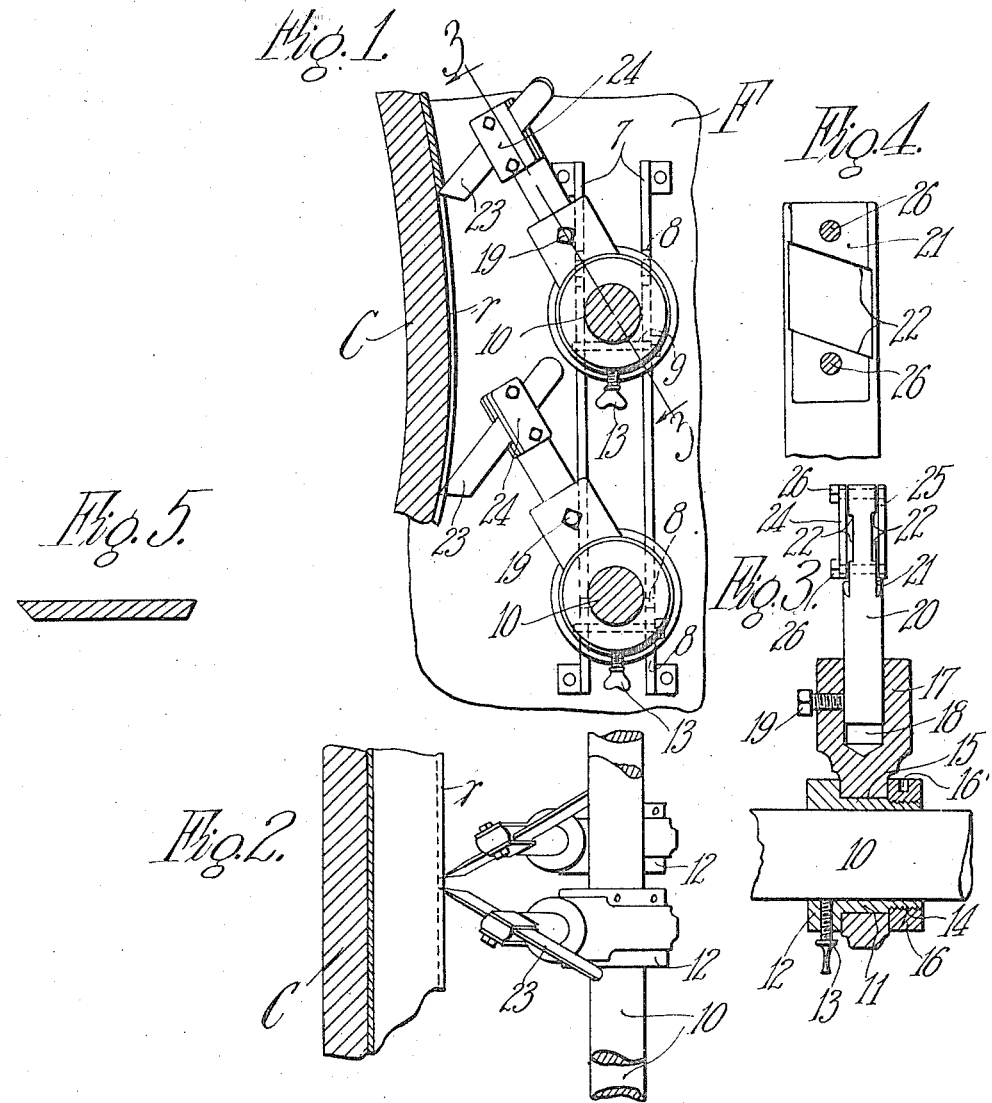

UNITED STATES PATENT OFFICE.

JOHN A. COOK, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR CUTTING AND BEVELING STRIPS.

1,290,097.   Specification of Letters Patent.   Patented Jan. 7, 1919.

Application filed April 1, 1918. Serial No. 225,954.

*To all whom it may concern:*

Be it known that I, JOHN A. COOK, a citizen of the United States, and residing at Chicopee Falls, in the county of Hampden and State of Massachusetts, have invented certain new and useful Improvements in Apparatus for Cutting and Beveling Strips, of which the following is a specification.

This invention relates to improvements in apparatus for cutting and beveling strips, as, for example, devices adapted to cut a web of rubber into a plurality of strips during a calendering operation and at the same time bevel the edges of the strips to any angle desired.

The preferred embodiment of my invention, for illustrative purposes, is directed to making narrow beveled strips of rubber such as are used in tire construction, and it is advantageous in producing such strips that they be cut from the web and beveled during the calendering operation and subsequently fed from the calender onto suitable stock-rolls from which the strips may be unwound and cut into lengths for the tire-building operations.

It is well known in the tire art that beveled rubber strips have been produced by slitting the web of rubber during the calendering operation and afterward beveling the edges by hand. This hand beveling, aside from requiring skilled operators and being at best a slow process, does not produce a bevel of a uniform angle throughout the length of the strip, which is particularly desirable in strips to be used on tire construction.

By reference to the prior art, it will be noted that cutting and beveling attachments have been designed for adaptation to calenders for producing strips from a web and having beveled edges, but these attachments are not capable of producing as narrow strips as are frequently required in the tire art, for the reason that the cutting-knife holders are limited in their lateral movement along the holder support by their abutment one to the other and consequently prevent a closely-spaced relation of the two knives of a pair. And further, the angle of the bevel is determined wholly by the construction of the cutting knives in the prior art which, to produce a bevel edge on the strips, are offset at their cutting edge. These knives are expensive to produce, and the offset portion is soon worn out by the continued grinding of the knife, which is necessary to present a sharp cutting edge to the web of material to be cut. It is also necessary to provide several sets of knives for each cutter, these having various angles of offset for the various angles of bevel on the strips.

According to my invention, I provide a cutting and beveling device which is particularly adapted to the rolls of calenders or like rolls and is constructed and arranged to cut strips from a web of material to any desired width and more especially the narrow strips of rubber used in tire construction. This I accomplish by providing two or more knife holder supports extending between the housings of the calender and parallel to the axis of the calender roll and on which separate supports are slidably mounted a plurality of sleeves adapted to be adjusted laterally along the supports, and knife-holding arms on the sleeves arranged to swing on the sleeves to bring the knives into engagement with the roll. According to another feature of my invention, I provide a means of the character described by arranging the supports one above another which permits of the knives being brought in a closely spaced relation apart at their cutting edges, or they may be adjusted to cut on the same line of the web.

The preferred embodiment of my invention is shown in the accompanying drawings for purposes of illustration.

In the drawings,—

Figure 1 is a cross-sectional elevation showing the cutting knives in operable position and in engagement with a calender roll;

Fig. 2 is a plan view of the same;

Fig. 3 is a sectional view on the line 3—3 of Fig. 1;

Fig. 4 is an elevational view of the cutting knife holder; and

Fig. 5 is a cross-section through a strip of material formed by the device.

Now referring to the drawings in detail, C represents a portion of a calender roll, represents a web of material, such as rubber stock, which has been rolled to a predetermined thickness between other calender rolls (not shown) and is about to be led from the lower peripheral surface of the roll C. The roll C is suitably mounted between housings F, one only of which is shown. Secured to each of the housings F and in spaced relation apart are two supports 7, in which are located the openings 8. The square-headed pins 9 fit loosely in the openings 8 and support the round knife-supporting shafts 10.

The sleeves 11 are rotatably and slidably mounted on the shafts 10 and are provided with a flanged portion 12 in which are located the set-screws 13. The set-screws are normally in engagement with the shafts 10 for the purpose of preventing a rotating or longitudinal movement of the sleeves during the cutting operation. The other end of the sleeves are provided with the threaded portions 14 (Fig. 3) and the bearing portions 15. The internally-threaded collars 16 are in threaded engagement with the threaded ends of the sleeves 11 and have in their periphery a plurality of holes 16' for turning the collars 16 upon the sleeves 11.

Loosely mounted on the sleeves 11, and normally held against a rotating or lateral movement, are the arms 17, which are provided with the axial openings 18 and the set-screws 19. The knife-holding members 20, which fit loosely in the openings 18 of the arm 17, are normally held from turning therein by the set-screws 19. The upper end of the knife holder 20, as best shown in Figs. 3 and 4, is provided with the flattened-off portions 21, in which are located the grooves 22. These grooves are substantially equal to the width of the knives 23, and, as will be seen, are cut at an angle with reference to the axis of the knife holder. The knife-clamping plates 24 and 25 are provided with bolt holes which are in alinement with the openings in the knife holder, as will be seen by referring to Figs. 3 and 4. The bolts 26 fit loosely in the holes in the plate 24 and the holder 20, and are provided with screw-threads on their ends for engagement with the tapped holes in the plate 25.

The cutting knife 23, which is best made from a rectangular bar of suitable cutting material, is sharpened to a suitable edge along a portion of its upper side, and the end is back cut obliquely to the top cutting edge of the knife for the purpose of presenting a cutting corner to the calender roll.

In operation, the knives are first set to produce a plurality of strips of predetermined widths by moving the sleeves 11 laterally along the shafts 10 and securing them thereto by the thumb-screws 13 and by turning the knife holders within the arms 17 until the desired angle is attained with relation to the face of the calender roll, after which the knife and holder may be swung away from the roll by reason of their fitting loosely on the sleeves, and are allowed to remain in an inoperable position until a web of material has been taken on by the calender roll. The web having been produced in the usual and well-known manner by placing the rubber stock between the top and center rolls of the calender, is rolled to a predetermined thickness and is led onto the bottom roll, at which time the knives are swung upwardly and inwardly toward the roll until the cutting point of the knives are in their normal operating position and are in engagement with the calender roll, which engagement slits the web of rubber stock into strips and bevels them according to the angularity of the knife with reference to the face of the roll. The knives are held in engagement with the roll in each instance by turning the threaded collar 16 until the arm 17 is securely clamped between this collar 16 and the collar 12 of the sleeve 11.

It will be seen from the foregoing description that beveled strips may be cut from the sheet $r$ and of any desired width even to the smallest dimension, while the knives used for this purpose may be of ordinary inexpensive construction or standard character. The invention is found primarily in the manner of mounting and supporting the standard knives and in presenting the latter as a pair to the sheet $r$ so that they may be adjusted without interference, for the purpose described.

While the foregoing is directed to a device particularly adapted to be used in connection with a calender for producing narrow strips of rubber, it is obvious that its use is not limited thereto, as many changes may be made in its design and construction to adapt the device to any calendering operation where it is required to produce narrow strips having beveled edges.

What I claim is—

1. Apparatus for cutting and beveling strips, comprising two spaced apart supports, a roll on which the strips are to be cut arranged substantially parallel to the supports, a pair of knife holders adjustably mounted one on each support for movement both toward and along the face of the roll, and a clamp on each knife holder adjustably mounted to present its knife for cutting and beveling the strip to any desired angle, all constructed and arranged for the adjustment of each knife independently of the position of the knife holder of the other knife and to coöperate with such other knife to obtain the result described.

2. Apparatus for cutting and beveling strips, comprising two horizontal supporting rods one arranged above the other, a roll on which the strips are to be cut arranged parallel to such supports and a pair of knife holders one on each support and each comprising a collar adjustably mounted along its support, means to fix the collar in its adjusted position, a radial supporting arm held on the collar for free movement toward and from the roll, a second radial arm held in the first-mentioned arm for angular adjustment with respect to its own axis with means to fix it in adjusted position, and a knife held in the last-mentioned arm of each holder, all for the purpose described.

JOHN A. COOK.